United States Patent Office 3,437,434
Patented Apr. 8, 1969

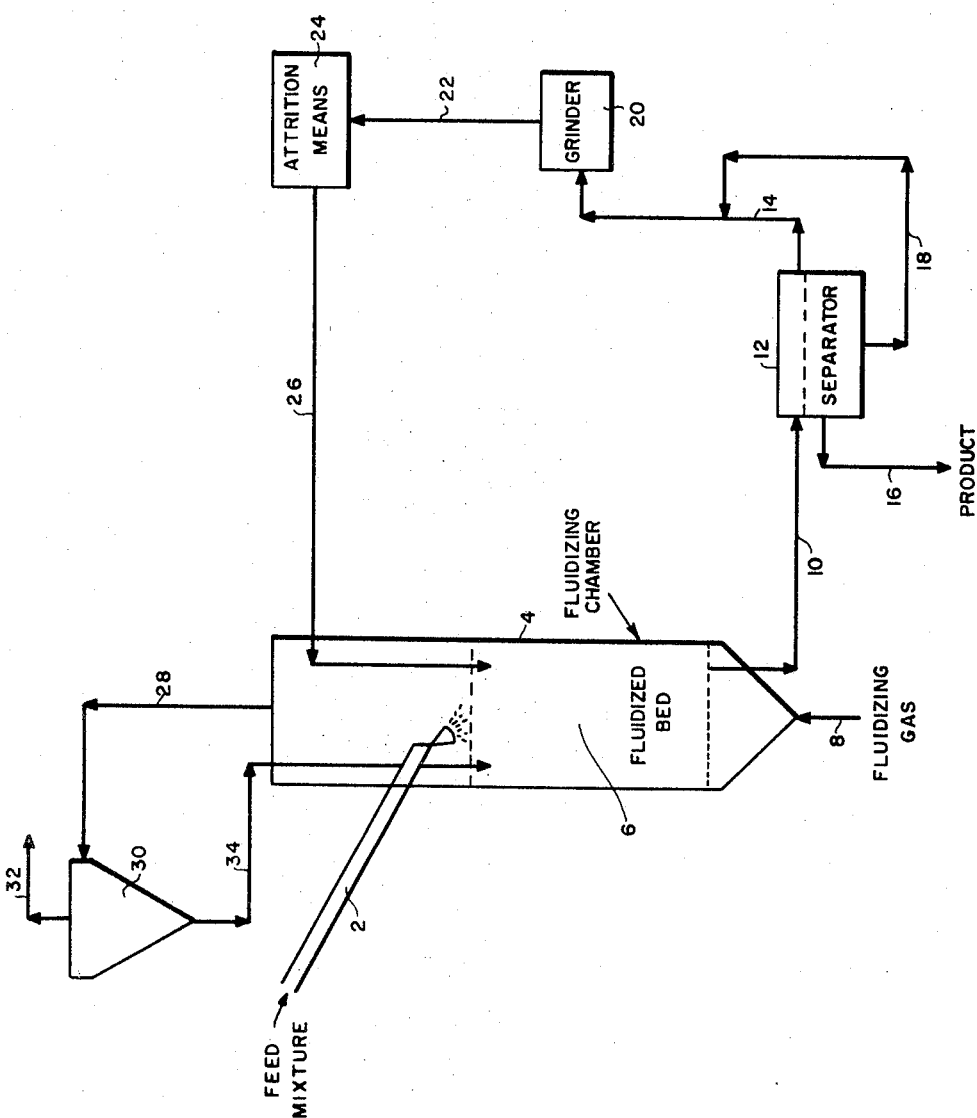

3,437,434
HIGH DENSITY SODIUM TRIPOLYPHOSPHATE
Jared S. Sproul, Fanwood, N.J., and Walter C. Lapple, Alliance, Ohio, assignors to FMC Corporation, New York, N.Y., a corporation of Delaware
Filed June 23, 1966, Ser. No. 559,994
Int. Cl. C01b 25/30
U.S. Cl. 23—106                              11 Claims

ABSTRACT OF THE DISCLOSURE

Dense granular Form II sodium tripolyphosphate (STPP) having a size of from about −20 mesh to about +100 mesh and a bulk density of 0.95 to 1.3 g./cc. is produced by feeding an aqueous mixture of sodium orthophosphate wherein the Na/P molar ratio is 1.63–1.7 into a fluidized bed containing discrete particles of sodium tripolyphosphate, maintaining the particles at 220–400° C., removing a portion of the fluidized particles from the bed, crushing a portion of the removed particles to obtain a mixture having a smaller average size than the particles within the bed, recycling this mixture of crushed particles back to the bed to replace the number of particles removed from the bed and recovering the remaining uncrushed fraction as Form II STPP product.

---

The present invention is concerned with the formation of a high density, granular sodium tripolyphosphate, and more specifically, to a granular (−20 +100 mesh) sodium tripolyphosphate having a bulk density of from about 0.95 to about 1.3 g./cc.

In the formation of modern heavy-duty detergent compositions sodium tripolyphosphate (STPP) has come into widespread use as a phosphate "builder" in order to increase the cleaning ability of these detergent compositions. One method for producing STPP is to react phosphoric acid and an alkaline compound such as sodium hydroxide or sodium carbonate together in an aqueous solution such that the mole ratio of sodium to phosphorus is on the order of about 1.67. This reaction results in the formation of an aqueous mixture containing monosodium orthophosphate and disodium orthophosphate in a mole ratio of about 1:2. The free water is removed from the above phosphate mixture by passing it through a heating zone where it is progressively heated to higher temperatures. At a temperature of about 250° C. or higher, sodium tripolyphosphate is formed. While the exact mole ratio of sodium to phosphorus which is employed may be varied, the ultimate reaction takes place in accordance with the following equation:

$$NaH_2PO_4 + 2Na_2HPO_4 \rightarrow Na_5P_3O_{10} + 2H_2O$$

The resulting STPP ($Na_5P_3O_{10}$) is a crystalline anhydrous product capable of having two physical forms. Form I is produced in rotary kilns at temperatures of from about 500–600° C., while Form II is produced at temperatures below about 500° C.

In carrying out the above process the heating zone which is conventionally employed is either a spray drier or a rotary kiln. In a spray drier operation the aqueous solution or slurry of monosodium orthophosphate and disodium orthophoshate is passed quickly through a high temperature heating zone. The resulting product is made up of about 30–50% granular STPP (−20 +100 mesh) and about 50–70% powdered STPP (−100 mesh). Further, the granular STPP product has a bulk density of about 0.45 to 0.65 g./cc.; the bulk density is the weight of STPP which freely flows into a container of given volume. A convenient method for measuring bulk density is the Solvay Process Method 302A set forth in the Solvay Technical and Engineering Service Bulletin No. 9 (p. 33) issued in 1944.

While some formulators prefer using this low bulk density granular STPP to offer the consumer the largest possible container per unit weight of detergent, many prefer to concentrate the detergent mixtures into small packages or tablets which are more convenient for customer use and which are less expensive to both package and ship; these latter formulators have found that high density granular STPP having a bulk density of at least 0.9 g./cc. is more desirable.

In order to manufacture the higher density, granular STPP product it has been customary to use a rotary kiln process. In this process an aqueous mixture containing the desired molar ratio of monosodium phosphate to disodium phosphate is gradually passed through a horizontally rotating kiln where it is progressively heated to a temperature of at least about 350° C. The resulting STPP spill from the kiln is then ground and screened to obtain a granular (−20 +100 mesh) product. After grinding, about 50% of the kiln spill is recovered as powder (−100 mesh) while the remaining 50% is recovered as the granular product (−20 +100 mesh) having a bulk density of from about 0.9 to about 0.95 g./cc.

The production of relatively high bulk density, granular STPP in a rotary kiln has several drawbacks. Initially, only about 50% of the total product obtained from the kiln is available as a granular material. Further, the product from the rotary kiln has a density ranging only from about 0.9 to about 0.95 g./cc. If an STPP product having higher bulk densities is desired from the rotary kiln, additional processing steps must be employed to increase its density. This entails using additional equipment which is undesirable because it adds to the processing cost and complicates the overall process of making STPP.

As a result there has been a need for a simplified, direct process which can be used to produce a granular sodium tripolyphosphate product having a density of from about 0.95 to about 1.3 g./cc. and in which the density of the product can be controlled within the above range to meet the requirements of the trade.

It is an object of the present invention to produce a granular sodium tripolyphosphate (STPP) of the Form II variety which is highly dense and by a process wherein the total product is recoverable as a granular STPP product.

It is a further object of the present invention to produce granular STPP whose density can be controlled within a range of 0.95 to 1.3 g./cc.

These and other objects will be apparent from the following description.

We have now found that a dense, granular Form II STPP product having a size of from about −20 mesh to about +100 mesh and a bulk density which can be controlled between about 0.95 and 1.3 g./cc. can be produced by feeding an aqueous mixture having a concentration of about 35 to 60% by weight of sodium orthophosphate wherein the Na/P molar ratio is about 1.63–1.7 into a fluidized bed containing discrete particles of sodium tripolyphosphate, maintaining the particles in the bed at a temperature of from about 220° to about 400° C., removing a portion of the fluidized particles from the bed, separating the removed particles into a coarse fraction (nominally +20 mesh) and a fine fraction (nominally −20 mesh), crushing the coarse fraction and mixing the crushed particles with a portion of the fine fraction to obtain a mixture having a smaller average size than the particles within the bed (preferably not smaller than about 70 mesh), recycling this mixture of particles back to the bed in amounts sufficient to replace the number of particles removed from the bed and recovering the remaining unmixed fine fraction having a size of from about −20 to +100 mesh as product.

In the above process, densification can be further enhanced to produce an STPP product having a density up to 1.3 g./cc. by adding with the aqueous feed up to about 1.5%, based on the weight of STPP product removed, of either $NH_4NO_3$ or an alkali metal nitrate and/or by subjecting the mixture of smaller sized particles, prior to being recycled to the bed, to high speed mechanical attrition with a moving object traveling at a peripheral velocity of at least about 2,300 ft./min.

Most advantageously, the entire product is recovered as granular (−20 +100 mesh) STPP product having an assay of from 96–99% STPP. Surprisingly, this STPP assay remains constant regardless of the density of the STPP product produced, namely 0.95–1.3 g./cc.

In carrying out the present process a bed containing STPP particles is fluidized by passing an upflowing stream of gas through the particles. The upflowing gas stream is maintained at a sufficient velocity to suspend the particles in a turbulent bed resting only on the rapidly moving gas. The bed desirably has a size of about −10 to about +100 mesh. The fluidizing gas may be any gas which is not reactive with the particles in the bed, e.g., air, nitrogen, $CO_2$, combustion gases from burning natural gas, etc.

The velocity of the upflowing gas stream needed to fluidize the particles depends upon the particle size, size distribution and the height of the bed. In general, fluidizing velocities of 2.5 ft./sec. to about 5 ft./sec. have been found operable; fluidizing velocity is defined as the volume flow of gas in the bed divided by the cross sectional area of the bed. The volume flow of gas does not include water vapor derived from the contents of the bed. Gas velocities lower than 2.5 ft./sec. result in undesired defluidization of larger particles, while velocities in excess of 5 ft./sec. can remove an excess of fines overhead.

The fluidized bed is then heated to a temperature of from about 220° to about 400° C. Temperature on the order of about 230–275° C. are generally preferred in order to obtain highest STPP assays, better heat efficiency and for ease of operation.

To the heated fluidized bed is added an aqueous feed liquor containing sodium and phosphorus values in an Na/P molar ratio of about 1.63–1.7. Molar ratios of Na/P of about 1.65 to about 1.69 have been found particularly advantageous.

The aqueous feed liquor fed to the fluidized bed can have a concentration of about 32–55% of STPP equivalent; this corresponds to a sodium orthophosphate concentration of about 35–60%. As the feed liquor concentration is reduced the density of the STPP product increases, e.g., up to about 1.05 g./cc. While the aqueous feed liquor can be fed in at room temperature it is preferred to heat the liquor to a temperature of from 80–100° C. to permit the make up of concentrated solutions and to minimize the heat load on the fluidized bed.

As the aqueous feed enters the fluidized bed it coats the surface of the STPP particles and the water in the feed is rapidly evaporated. The residual sodium phosphate deposits as a shell on the outer surface of the particles and is quickly converted to STPP at the operating temperatures of the bed. In this way the particles in the bed increase in size by the laminar build up of STPP layers.

A portion of the particles in the bed is continuously removed and screened to separate oversized particles (preferably +20 mesh) from the remaining finer (−20 mesh) particles. The oversized (+20 mesh) fraction is lightly crushed in a mill such as a Fitzpatrick Comminuting Machine (Fitz Mill) or a roller mill so that the particles have a smaller average size than the particles within the bed. The crushing step should be controlled to avoid obtaining substantial amounts of −70 mesh particles. In general, these crushed particles should have a size of about −20 to about +70 mesh; they are then recycled to the fluidized bed.

The remaining finer (−20 mesh) fraction removed from the fluidized bed may be screened to separate a product fraction, normally −20 to +100 mesh and preferably −20 to +70 mesh. All −20 +100 mesh particles not removed as product are recycled with the crushed particles to the fluidized bed. In the preferred embodiment for obtaining highest bulk density all −20 mesh particles not withdrawn as product are mixed with the oversized (+20 mesh) particles and sent to the mill or grinder to crush the mixture so that the resulting crushed mixture has a smaller average size than the particles within the fluidized bed; the crushed mixture is then recycled to the bed.

The ratio of recycled particles to STPP product removed from the bed may vary from about 0.5:1 to about 5:1. It is generally preferred to conduct the recycle at ratios of from about 1:1 to about 2:1. In general, the recycle must replace the number of particles drawn off from the bed in order to have a continuous self-replenishing fluidized bed.

In addition to removing the desired fluidized particles from the bed, smaller particles (fines) are inevitably blown out through the top of the fluidized bed. These fines may be separated from the upflowing gas stream and recycled to the bed to prevent loss of phosphorus values in the system. Because of the limited amount of fines which are recycled, they do not interfere with the bed operation. In general, upon being returned to the bed they eventually agglomerate to form STPP particles which will remain fluidized and turned into dense product.

The product recovered from the above process has a density of at least 0.95 g./cc. and can reach bulk densities of 1.2 g./cc. particularly where dilute solutions of the feed liquor are employed in the process. For example, at a feed liquor concentration of about 47% STPP equivalent, a product having a density of about 1.12 is produced. However, when the concentration of the feed liquor was reduced to 32.5% of STPP equivalent, the bulk density of the resultant product increased to 1.23 g./cc. In order to get a product having maximum density, i.e., bulk densities up to about 1.3 g./cc. it is desirable to use either or both of two densifying techniques—the first is nitrate addition and the second is mechanical attrition.

In the first modification an additive which may be either ammonium nitrate or an alkali metal nitrate, e.g., sodium nitrate, potassium nitrate, etc. is added to the fluidized bed in amounts up to about 1.5% based on the weight of STPP product recovered. The preferred alkali metal nitrate is sodium nitrate and this may be added to the fluidized bed either separately or it may be included in the feed liquor. It is not known how the nitrate addition aids in increasing the density of the resultant product, but it is believed that the nitrate acts in some manner to make the STPP particles rounder or smoother so as to reduce interparticle voidage of the final product. This increases bulk density. For example, the addition of $NaNO_3$ in amounts up to about 1.5% increases the bulk density of the STPP product by about 0.01 g./cc. per 0.1% of sodium nitrate added. Obviously, larger amounts of nitrate can be used but the largest increases in bulk density occur at levels up to about 1.5%.

The second technique for increasing the density of the STPP product is to subject recycled STPP particles, to a high speed mechanical attrition. This is achieved by placing the recycle particles in a container and subjecting them to a striking force by a moving element (preferably a rotating blade) traveling at a peripheral velocity of from about 2,300–10,000 ft./min. The attrition serves to round off corners and other irregularities in the treated particles. It is preferred to utilize the mechanical attrition step in the recycle stream following the mild crushing of recycle STPP particles.

A preferred practice of the present process will now be illustrated with reference to the attached drawing which represents a diagrammatical flow sheet for carrying out the invention in a continuous process.

In the drawing an aqueous feed liquor is introduced through line 2 into the fluidizing chamber 4 containing a fluidized bed 6 supported by a fluidizing gas introduced through bottom port 8. The aqueous feed liquor introduced into line 2 contains a mixture of monosodium orthophosphate and disodium orthophosphate having an Na/P molar ratio of about 1.63–1.7. In addition the feed liquor may also contain an agent for densifying the STPP product such as ammonium nitrate or an alkali metal nitrate such as sodium nitrate or potassium nitrate. For ease of operation sodium nitrate is preferred because it does not introduce contaminating cations into the product. The fluidized bed 6 contained in the fluidizing chamber 4 contains granular STPP particles ranging in size from about −10 to +100 mesh. In continuous operation this bed contains substantially all STPP except for minor amounts of orthophosphate and intermediate polyphosphates being converted to STPP.

In starting up the bed the preferred method is to utilize preformed particles of STPP. This permits the immediate formation of a uniform bed which has no sticking or agglomerating tendencies. An alternate method of starting is to treat a mixture of monosodium orthophosphate and disodium orthophosphate in the correct ratio to yield STPP and heat this in a preliminary heating zone until a substantial portion has been converted to sodium pyrophosphate. This blend can then be placed in a fluidized bed and converted to STPP within the bed. It is not advisable to attempt to form a fluidized bed of STPP commencing with sodium orthophosphate since this goes through a sticky state as it passes from the orthophosphate to the pyrophosphate stage and prevents proper fluidization of the mixture.

The fluidized bed 6 is maintained at a temperature of about 220° C. to about 400° C. during the process. This temperature can be achieved by preheating the fluidizing gas or by externally heating the fluidized bed by means of a heating jacket, not shown, surrounding the fluidizing reactor 4. The preferred method is to heat the fluidizing gas to temperatures on the order of about 600° C. The feed liquor is maintained as concentrated as possible commensurate with obtaining the density desired of the final product. In general, more dilute solutions yield higher densities.

In the fluidized bed 6 the fluidized particles commence to grow as follows. The feed liquor deposits an aqueous mixture of sodium phosphates on the surface of the particles. Water in the feed is immediately evaporated leaving a sodium orthophosphate residue which is converted to STPP at the temperatures existing in the fluidized bed. The deposition of laminar layers of STPP on the surface of the particles results in the formation of very dense particles. A portion of the fluidized particles is then removed from the fluidizing chamber 4 by means of conduit 10 and passed into a separator 12. The separator 12 may be a screening device, an elutriator or air classifier commonly used in the art. The separator 12 divides the particles into two fractions.

The first fraction is made up of particles which are larger than the average diameter of the desired product which for convenience sake is normally considered about +20 mesh. These are withdrawn from the separator 12 through conduit 14 and passed to a grinder or mill 20 and lightly crushed so that the particles have a size of −20 to +70 mesh. From the second (−20 mesh) fraction a portion is withdrawn as the product fraction, normally −20 +100 mesh, through conduit 16. The remainder of the −20 mesh fraction is removed from separator 12 through line 18. In the preferred mode of operation illustrated in the drawing for obtaining highest bulk density, the fine fraction in line 18 is mixed with the coarse fraction from conduit 14. This mixed fraction is then passed into grinder 20 and ground until its average particle size is somewhat smaller than the average particle size of the particles in the fluidized bed, but preferably no finer than about 70 mesh.

The function of the grinding stage is to reduce the size of the particles which are recycled into the bed so that laminar build up of STPP layers is obtained on these particles. This results in the production of an extremely dense product.

The crushed mixture which is obtained in conduit 22 is then preferably passed through attrition means 24. In this stage the particles are subjected to high speed mechanical attirtion by being struck by one or more blades traveling at a velocity of from about 2,300–10,000 ft./min. The mechanical attrition obtained rounds off the corners and other irregularities in the crushed particles. In this way the particles leaving attrition means 24 have a more spherical configuration than those which are removed from grinder 20. The product from attrition means 24 is then passed through conduit 26 back into the fluidizing chamber 4 and into the fluidized bed 6. The amount of STPP equivalent in the feed liquor and the amount of STPP product removed by line 16 are maintained approximately the same in order to maintain the bed at a constant size. In addition, the amount of recycling is regulated so that the number of particles entering fluidized bed 6 is sufficient to replace the number removed from conduit 10.

In the above description of the invention the −20 mesh fraction not withdrawn as product from separator 12 is mixed with the coarse (+20 mesh) fraction from the separator 12 and passed through the grinder 20 before it is recycled back to the fluidized bed 6. It is also possible if desired to recycle the −20 mesh fraction in line 18 directly to the fluidized bed 6 without sending it through the grinder 20.

In the operation of the fluidized bed some fines will be blown out of the fluidized bed 6 with the overhead gases. These particles can be recovered from the overhead port 28 by means of a cyclone separator 30 or other separating means. The recovered fines may then be returned by line 34 while the overhead gas stream is passed through separator 30 and vented through conduit 32. These fines agglomerate within the bed into larger size particles which remain fluidized thereby preventing STPP losses in the fluidized reactor.

In the above description of the invention the product was removed as an undersize fraction (nominally −20 mesh) directly from the fluidized bed. However, it is within the contemplation of the present invention that some (−20 mesh) product may also be screened out of the system after the grinding step or the mechanical attrition step; this is a more expensive and difficult separation because it is more difficult to separate a product fraction from the finer particles obtained after the grinding step and thus is not as economically attractive. Further it is within the contemplation of the present process to selectively screen out only a product fraction from the fluidized bed discharge and recycle the remaining particles to the fluidized bed, after grinding enough of the remainder to supply sufficient particles to maintain the fluidized bed.

The following examples are given to illustrate the present invention and are not deemed to be limiting thereof.

EXAMPLE 1

A fluidized bed of sodium tripolyphosphate was established in a fluidized reactor 1.5 ft. in diameter by suspending STPP particles in an upflowing stream of combustion gases flowing at a fluidization velocity of 4 ft./sec. The bed was 3 ft. high and was maintained at 279° C. by the preheated fluidizing gas. An aqueous solution containing 47% by weight of sodium orthophosphate having a molar ratio of Na/P of 1.67 and 0.002 lb. of NaNO₃ per pound of sodium orthophosphate was sprayed into the fluidized bed. The solution was introduced at 105 lbs./hr. through a spray nozzle positioned 2 ft. above the bed. Fluidized particles of STPP were discharged from the bed at a rate of 143 lbs./hr. and analyzed 17% +20 mesh, 95% +50 mesh and 99% +100 mesh. The discharged particles were screened to separate +20 mesh particles from the −20 mesh particles. The +20 mesh particles were lightly crushed in a Fitz Mill to 0% +20 mesh, 80% +50 mesh and 93% +100 mesh. The crushed particles were mixed with enough of the −20 mesh particles to provide 95 lbs./hr. of recycle. The recycle stream analyzed 0% +20 mesh, 89% +50 mesh and 95% +100 mesh. The remaining −20 mesh fraction was recovered as product at a rate of 48 lbs./hr. Fines removed overhead from the bed in the fluidizing gas stream were collected and recycle. The product fraction had a bulk density of 1.00 g./cc.

EXAMPLE 2

The process of Example 1 was repeated substantially as described above except that the feed liquor sprayed into the fluidized bed contained 0.004 lb. of sodium nitrate per pound of sodium orthophosphate present in the feed. The resulting STPP product fraction was analyzed and found to have a bulk density of 1.07 g./cc.

EXAMPLE 3

The process of Example 1 was repeated substantially as described above except that the feed liquor sprayed into the fluidized bed contained 0.014 lb. of sodium nitrate per pound of sodium orthophosphate present in the feed. The resulting STPP product fraction was analyzed and found to have a bulk density of 1.16 g./cc.

EXAMPLE 4

The procedure of Example 1 described above was repeated substantially the same except that the feed liquor contained 0.006 lb. of sodium nitrate per pound of sodium orthophosphate present in the feed. In addition, the +20 mesh fraction which was subjected to light crushing was first passed through a high shear attrition means which had blades turning at a peripheral speed of about 2,300 ft./min. The discharge from the high shear attrition means was mixed with the remaining recycle stream and returned to the fluidized bed. A product fraction was recovered having a bulk density of 1.21 g./cc.

EXAMPLE 5

The process of example 4 was repeated substantially as set forth except that the feed liquor contained 0.009 lb. of sodium nitrate per pound of sodium orthophosphate present. The product fraction recovered had a bulk density of 1.28 g./cc.

EXAMPLE 6

A fluidized bed of sodium tripolyphosphate was established in a fluidized reactor 1.5 ft. in diameter by suspending STPP particles in an upflowing stream of preheated fluidizing gas flowing at a fluidization velocity of 4 ft./sec. The bed was 3 ft. high and was maintained at 250° C. by the preheated fluidizing gas. An aqueous solution containing 47% by weight of sodium orthophosphate having a molar ratio of sodium to phosphorus of 1.667 and 0.002 lb. of sodium nitrate per pound of sodium orthophosphate was sprayed into the fluidized bed. The solution was introduced at 100 lbs./hr. to a spray nozzle positioned 2 ft. above the bed. The fluidized particles of STPP were discharged from the bed at a rate of 119 lbs./hr. and analyzed 19% +20 mesh, 98% +50 mesh and 99% +100 mesh. The discharged particles were screened to separate +18 mesh particles from the −18 mesh particles. The +18 mesh particles were mixed with enough of the −18 mesh particles to provide a 75 lbs./hr. mixture. This mixture was sent to a Fitz Mill where it was lightly crushed and then recycled back to the fluidized bed. The recycle mixture, after being lightly crushed, analyzed 1% +20 mesh, 81% +50 mesh and 91% +100 mesh. The remaining −18 mesh fraction was recovered as product at a rate of 44 lbs./hr. Fines removed overhead from the bed in the fluidizing gas stream were collected and recycled at a rate of 6 lbs./hr. The product fraction had a bulk density of 1.12 g./cc.

EXAMPLE 7

The procedure of Example 6 was repeated substantially as set forth above except that the feed liquor was diluted to 42% by weight of sodium orthophosphate having a molar ratio of Na/P of 1.667. The resultant product had a bulk density of 1.14 g./cc.

EXAMPLE 8

The procedure of Example 6 was repeated substantially as set forth above except that the feed liquor was diluted to 37% by weight of sodium orthophosphate having a molar ratio of Na/P of 1.667. The resultant product had a bulk density of 1.19 g./cc.

EXAMPLE 9

The procedure of Example 6 was repeated substantially as set forth above except that the feed liquor was diluted to 32% by weight of sodium orthophosphate having a molar ratio of Na/P of 1.667. The resultant product had a bulk density of 1.23 g./cc.

EXAMPLE 10

The procedure of Example 6 was repeated substantially as set forth above except that NH₄NO₃ was substituted for sodium nitrate. The results were substantially the same as when sodium nitrate was employed.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. In the process of producing a granular Form II sodium tripolyphosphate product having a size of substantially −20 mesh to +100 mesh by feeding an aqueous mixture of sodium phosphate having an Na/P molar ratio of 1.63–1.7 into a fluidized bed containing discrete particles of fluidized sodium tripolyphosphate and maintaining the particles in the bed at a temperature of from 220–400° C., the improvement which comprises controlling the bulk density of the product between 0.95 and 1.3 g./cc. by removing a portion of the fluidized particles from the bed, separating the removed particles into a coarse fraction and a fine fraction, crushing the coarse fraction and mixing the resultant crushed particles with a portion of the fine fraction to obtain a mixture having a smaller average size than the particles within said bed, recycling the mixture of particles back to the bed in amounts sufficient to replace the number of particles removed therefrom, and recovering the unmixed remainder of said fine fraction having a size of substantially −20 to +100 mesh as product.

2. In the process of producing a granular Form II sodium tripolyphosphate product having a size of substantially −20 mesh to +100 mesh by feeding an aqueous mixture of sodium phosphate having an Na/P molar ratio of 1.63–1.7 into a fluidized bed containing discrete particles of fluidized sodium tripolyphosphate and maintaining the particles in the bed at a temperature of from 220–400° C., the improvement which comprises controlling the bulk density of the product between 0.95 and 1.3 g./cc. by removing a portion of the fluidized particles from the bed, separating a first fraction from the particles removed from the bed, crushing sufficient amounts of the remaining fraction from the particles removed from the bed to obtain a mixture of particles having a smaller average size than the particles within said bed, recycling said mixture of particles back to the bed in amounts sufficient to replace the number of particles removed therefrom, and recovering said first fraction having a size of substantially −20 +100 mesh as product.

3. Process of claim 1 wherein there is added with the aqueous mixture up to about 1.5%, based on the weight of the sodium tripolyphosphate product removed, of a member selected from the group consisting of $NH_4NO_3$ and an alkali metal nitrate.

4. Process of claim 1 wherein there is added with the aqueous mixture up to about 1.5%, based on the weight of the sodium tripolyphosphate product removed, of sodium nitrate.

5. Process of claim 1 wherein said fluidized particles removed from the bed are separated into a +20 and a −20 fraction, said +20 fraction is lightly crushed, mixing said crushed particles with a portion of said −20 mesh particles to obtain a recycle mixture whose particles have a smaller average size than the particles within the bed, and recycling said recycle mixture to the bed.

6. Process of claim 1 wherein said fluidized particles removed from the bed are separated into a +20 and a −20 fraction, separating from said −20 fraction a product fraction having a size from −20 to +100 mesh, mixing said +20 fraction and remaining −20 mesh particles, crushing the particles in the mixture to obtain a recycle mixture whose particles have a smaller average size than the particles within said bed and recycling said recycle mixture to said bed.

7. Process of claim 1 wherein prior to recycling the mixture of smaller size particles back to the bed they are subjected to high speed mechanical attrition with a striking element traveling at a peripheral velocity of at least about 2,300 ft./min.

8. Process of claim 1 wherein said fluidized particles removed from the bed are separated into a +20 and a −20 fraction, said +20 fraction is lightly crushed and mixed with a portion of the −20 fraction to form a recycle mixture whose particles have a smaller average size than the particles within said bed, treating said recycle mixture to high speed mechanical attrition with a striking element traveling at a peripheral velocity of at least about 2,300 ft./min., returning said recycle stream after mechanical attrition to said bed, and recovering the remaining −20 mesh fraction withdrawn from the bed as product.

9. Process of claim 1 wherein said fluidized particles removed from the bed are separated into a +20 and a −20 fraction, separating from said −20 fraction a product fraction having a size from −20 to +100 mesh, mixing said +20 fraction and remaining −20 mesh particles, crushing the particles in the mixture to obtain a recycle mixture whose particles have a smaller average size than the particles within said bed, subjecting said recycle mixture to high speed mechanical attrition with a striking element traveling at a peripheral velocity of at least about 2,300 ft./min. and passing said recycle mixture after mechanical attrition to said bed.

10. Process of claim 1 wherein there is added with the aqueous mixture up to about 1.5%, based on the weight of the sodium tripolyphosphate product removed, of a member selected from the group consisting of $NH_4NO_3$ and an alkali metal nitrate and wherein prior to recycling the mixture of smaller sized particles back to the bed they are subjected to high speed mechanical attrition with a striking element traveling at a peripheral velocity of at least about 2,300 ft./min.

11. Process of claim 1 wherein the ratio of recycled particles to said product is from about 0.5:1 to about 5:1.

References Cited

UNITED STATES PATENTS

| | | | |
|---|---|---|---|
| 3,210,154 | 10/1965 | Klein et al. | 23—106 |
| 3,360,342 | 12/1967 | Pals | 23—293 |
| 3,094,382 | 6/1963 | Bigot | 23—107 |

OSCAR R. VERTIZ, *Primary Examiner.*

LUTHER A. MARSH, *Assistant Examiner.*